United States Patent [19]
Everett

[11] Patent Number: 5,857,152
[45] Date of Patent: Jan. 5, 1999

[54] ELECTRONIC TOLL PAYMENT

[75] Inventor: David Barrington Everett, Brighton, England

[73] Assignee: Mondex International Limited, London, England

[21] Appl. No.: 682,503

[22] PCT Filed: Feb. 1, 1995

[86] PCT No.: PCT/GB95/00198

§ 371 Date: Oct. 3, 1996

§ 102(e) Date: Oct. 3, 1996

[87] PCT Pub. No.: WO95/21424

PCT Pub. Date: Aug. 10, 1995

[30] Foreign Application Priority Data

Feb. 1, 1994 [GB] United Kingdom .................. 9401924

[51] Int. Cl.[6] ....................................................... G08G 1/00
[52] U.S. Cl. ........................... 455/406; 455/407; 340/928; 340/933; 340/825.54; 235/486; 235/384
[58] Field of Search ................................ 340/933, 941, 340/928, 942, 943, 825.31, 825.33, 825.34, 825.54; 235/486, 384; 379/58, 59, 91, 144, 357; 455/406, 407, 408, 409

[56] References Cited

U.S. PATENT DOCUMENTS

| | | | |
|---|---|---|---|
| 5,144,649 | 9/1992 | Zicker et al. ............................. | 379/59 |
| 5,204,675 | 4/1993 | Sekine ..................................... | 340/933 |
| 5,310,999 | 5/1994 | Claus et al. .............................. | 235/384 |
| 5,451,758 | 9/1995 | Jesadanont ............................... | 235/384 |
| 5,485,505 | 1/1996 | Norman et al. .......................... | 379/58 |
| 5,485,520 | 1/1996 | Chaum et al. ........................... | 380/24 |

FOREIGN PATENT DOCUMENTS

| | | |
|---|---|---|
| 0298343 | 1/1989 | European Pat. Off. . |
| 0347090 | 12/1989 | European Pat. Off. . |
| 0401192 | 12/1990 | European Pat. Off. . |
| 0413948 | 2/1991 | European Pat. Off. . |
| 0577328 | 1/1994 | European Pat. Off. . |
| 0585718 | 3/1994 | European Pat. Off. . |
| 3805810 | 9/1989 | Germany . |

*Primary Examiner*—Jeffery A. Hofsass
*Assistant Examiner*—Ashok Mannava
*Attorney, Agent, or Firm*—Volpe and Koenig, P.C.

[57] ABSTRACT

A system for toll payment by electronic cash identifies an electronic purse and effects value transfer over a communication system without stopping the mobile (vehicle or person). Mobile identity MID is temporarily correlated with purse identity PID and one or another identity is erased on satisfactory or non-satisfactory completion of the transaction thereby allowing non-payers to be pursued while preserving the principle of anonymity.

13 Claims, 2 Drawing Sheets

ELECTRONIC TOLL PAYMENT

The invention relates to electronic toll payment. A toll is a charge for access to a facility. As far as road vehicles are concerned tolls may be payable for access to roads, tunnels and bridges, for example. As far as individuals are concerned the entrance fees to entertainments such as sporting events or the fares for mass transit facilities may be regarded as tolls.

A problem with toll fee collection is that it takes time and vehicles and individuals are held up by passage through toll gates or turnstiles. Proposals have been made for the electronic payment of tolls whereby fixed sensors interact remotely with devices carried by passing vehicles or persons and, for example, a pre-paid token or card in the device is cancelled or partially cancelled as payment.

Facility-specific pre-paid cards (a phone card is an example) have the important advantage of anonymity but are inflexible in use. Transactions involving them are insecure and are not themselves fund-transfer transactions. An object of the invention is to facilitate toll payment by electronic cash.

Electronic cash is held in electronic purses. An electronic purse is a device used in a value transfer system for cashless transactions. Value is transferred electronically from one purse to another or from banks' or retailers' terminals. Transfer may be made by direct electronic connection between purses, by telephone connection using modems or by remote communication using infra-red light or radio. Key features of a satisfactory electronic cash system are true, anonymity and security. Security is a particular problem when value messages in the system broadcast by radio, magnetic or optical/infra-red signals as is inevitable in a remote, contactless transaction. A suitable electronic cash system is described in patent application Nos. WO91/16691 and WO93/08545. Here, transactions are truly anonymous and security is ensured by a public/private key encryption system. Individual messages in the system can be transmitted in less than 100 ms but there may typically be three or four messages interchanged in a transaction and encryption/decryption of each may take 500 ms. Therefore, a typical transaction may take seconds to complete. This is too long to allow swiftly moving traffic to effect a secure electronic cash transaction in passing a toll gantry.

According to the invention there is provided a system for toll payment by mobiles comprising, on each mobile a communication device and an electronic purse coupled to the device, the electronic purse being part of an electronic cash system, the toll payment system comprising localiser means for localising communication devices and a remote communication system for communicating with mobile communication devices to effect toll payments by exchanging cryptographically secure value transfer messages. A "mobile" can be a vehicle or person.

A problem with remote toll payment systems is in maintaining the ability to pursue those who have not paid while preserving the principle of anonymity. One method of enforcing payment is to arrange that the electronic purse shall carry a receipt of a completed toll payment. Physical spot checks can reveal non-payment and act as a deterrent. However, it may be preferred to enable automatic detection of non-payers. This is particularly difficult if the anonymity of electronic cash is to be preserved. A preferred feature of the invention provides a solution.

Thus, preferably means are provided for obtaining a mobile identifier identifying the communication device or the mobile carrying the electronic purse; means are provided for correlating temporarily the mobile identifier with an identifier for the electronic purse and means are provided for (a) discarding the mobile identifier if the toll payment transaction is completed satisfactorily or (b) discarding the purse identifier if the toll payment transaction fails. With this arrangement while anonymity is potentially destroyed by associating the purse identifier with the mobile identifier it is to be noted that this association is temporary only. It is ensured that the association is destroyed by discarding one or another of the identifiers in dependence on the outcome of the transaction. If the transaction is not completed then the mobile identifier can be used to trace the customer. Thus, communication devices may be individually registered to customers and the mobile identifier may be that of the communication device. In particular, the communication device may be a mobile telephone in a cellular telephone system. The system may be a GSM (Groupe Speciale Mobile) system in which each telephone carries a personal identifier chip. The customer may thus be identified by reference to his registration on the telephone system.

The mobile identifier may take other forms. For example, a photographic or video camera may be positioned on a gantry to photograph the number plates of vehicles in a road toll system. Such photographs or more usually video recordings would be discarded if the toll payment transaction were completed satisfactorily. Alternatively microwave or radio tag identification association with the vehicles or communication devices might be employed.

The localiser means may comprise a physical channelling system to allow individual mobiles to be identified. However, in some arrangements the mere presence of a communication device in a general area or in a particular succession of areas may be sufficient to generate a requirement for a toll payment.

A cellular telephone system gives a coarse location of a telephone by reference to cell identity. This in itself may provide sufficient localiser information in some instances.

Alternatively it is envisaged that localiser information may be obtained from a navigation system such as a Global Positioning System (GPS) satellite system.

The invention will further be described with reference to the accompanying drawings, of which:

Figure 1:
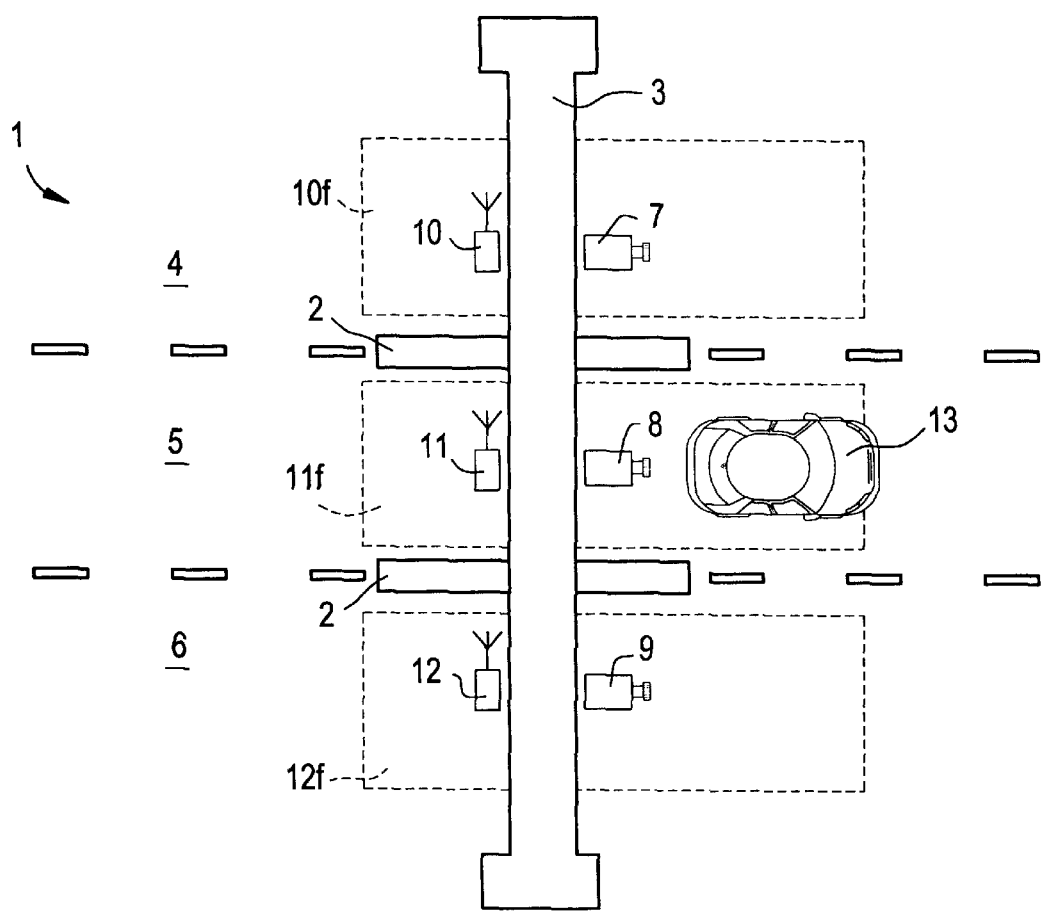
FIG. 1 is a plan view of part of a toll payment system in accordance with the invention.

Referring to FIG. 1 there is shown one three-lane express payment carriageway 1 of a road for which tolls are to be levied. Traffic islands 2 channel the lanes at a toll gantry 3. The three express lanes 4, 5, 6 are for non-stop electronic toll payment. It is to be understood that traffic without electronic payment facilities is diverted through conventional toll gates (not shown).

Each of the three lanes 4,5,6 is observed by a respective video camera 7, 8, 9 which is triggered to photograph the rear of each vehicle 13. Each lane 4,5,6 also has a very short range radio transmitter/receiver 10, 11, 12 shielded from its neighbours by electromagnetic shielding to give a respective radio footprint 10f, 11f, 12f covering only its respective lane 4,5,6 so as to allow localised communication with a vehicle 13.

Figure 2:
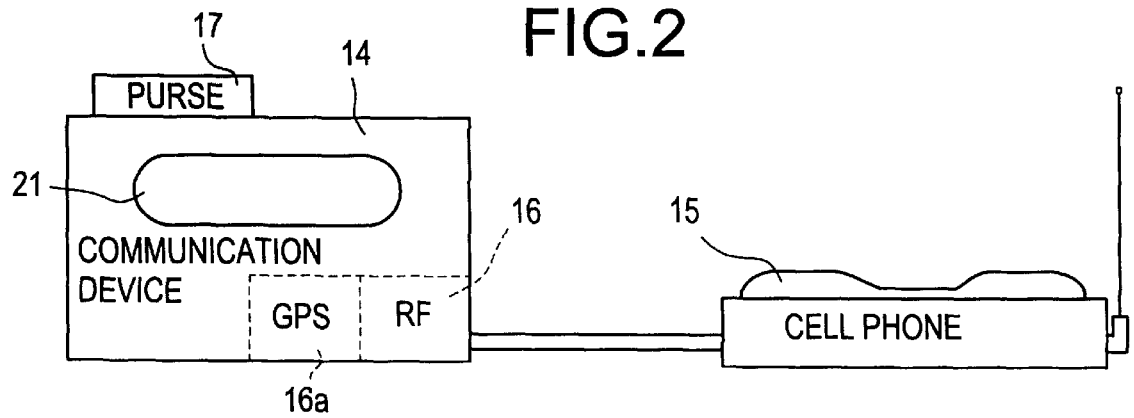
FIG. 2 is a diagram of the communication device and electronic purse of FIG. 1.

Referring now to FIG. 2 there is shown a communication device 14 mounted on the dash-board of a vehicle 13. The device 14 is connected to a GSM digital telephone 15 in the vehicle 13 and also incorporates a very short range radio transmitter/receiver 16 tuned to the frequency of the units 10, 11, 12 on the gantry 3. A Global Positioning System (GPS) receiver 16a may alternatively be included and coupled to the communication device 14 to provide an additional localiser function or when short range transmitter/receivers 11, 16 are not desired. As understood by those familiar with this art, the GPS receiver 16a receives three or more GPS signals from the network of 24 orbiting NAVSTAR satellites 24 triangulating the vehicle's 13 position. By constantly updating the vehicle's 13 position, the GPS receiver 16a can also accurately provide speed and direction of travel. By comparing a vehicle's 13 current position against preprogramed, predetermined locations, the GPS receiver 16a determines if the carriageway 1 should be tolled and initiates a transfer of value. The communication device 14 also has a slot to accept an electronic purse in the form of a smart card 17. This forms part of an electronic cash system of the kind described in patent publications Nos WO91/16691 and WO93/08545. The electronic cash system employs value transactions using encrypted value messages as described in the foregoing specifications.

Figure 3:
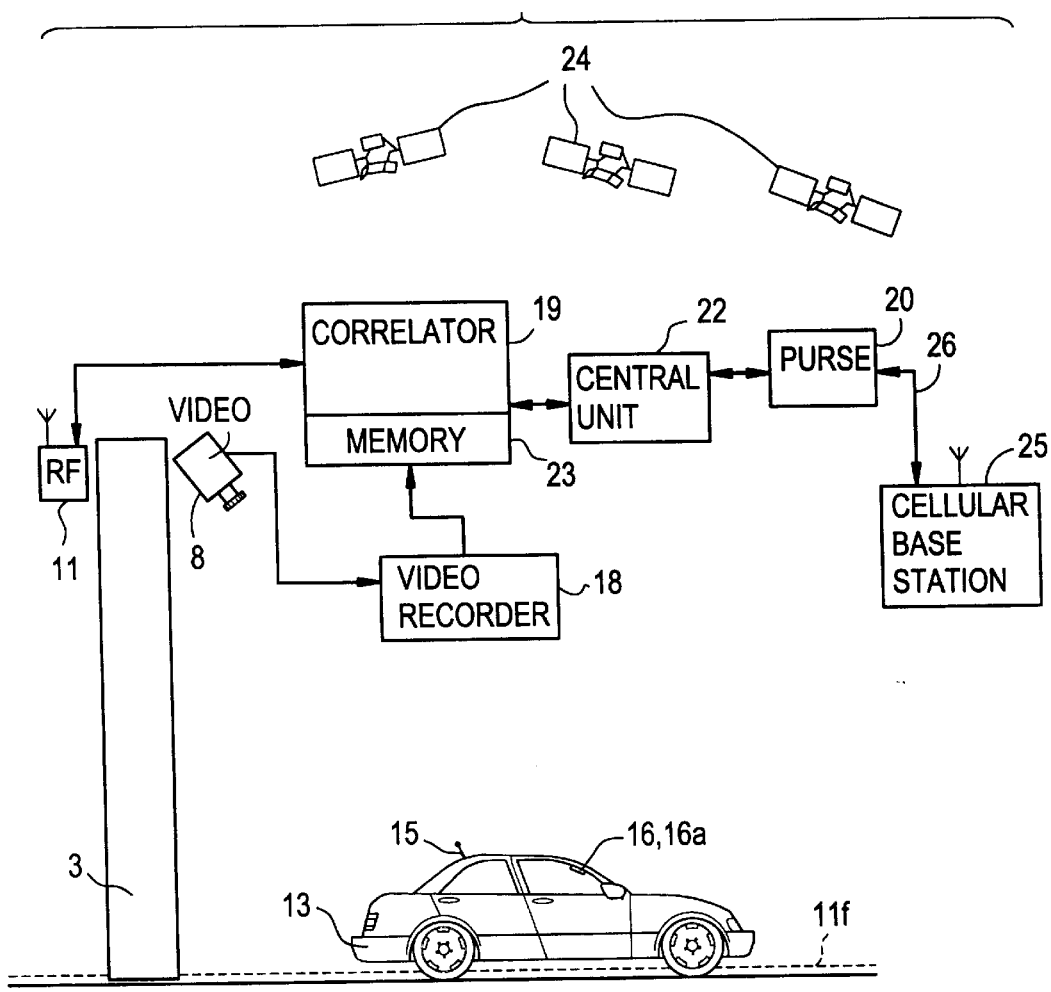
FIG. 3 is a schematic diagram of the toll payment system of FIG. 1.

Referring now to FIG. 3 the vehicle 13 is shown having passed the gantry 3 at full speed. On passing the gantry 3 the transmitter/receiver 16 detects a signal from transmitter/receiver 11 and responds by transmitting a digital serial signal conveying the identity of the vehicle's electronic purse 17. This identity 17 is unique in the electronic cash system. The transmitter/receiver 11 passes this identity to a correlator 19 which is linked to a video recorder 18. The correlator 19 identifies the frames of the video recording pertinent to the vehicle 13 and stores this information in a memory 19 as a mobile identification signal (MID) with the associated purse identification information (PID).

After sending its PID, the communication device 14 is triggered automatically to call a predetermined number on the GSM telephone system. The cell phone 15 communicates with a cellular base station 25 which communicates over a land line 26 with an electronic purse 20 of the road operator. An electronic funds transfer is initiated to transfer the toll required from the customer's purse 17 to the purse 20. On satisfactory transfer of the funds an acknowledgement message is sent to purse 17 and this will be displayed 21 on the communication device 14 (FIG. 2).

The PIDs of successful transactions are passed from the purse 20 to a central unit 22 and this is effective to identify the PID in the store and to erase at least the associated MID and preferably both the PID and MID. Thus there is no identifiable correlation between a mobile identifier and a purse identifier for a successful toll payment. The video images 18 may or may not be retained.

Any MIDs which are not cancelled after a predetermined time represent vehicles for which the toll payment has failed for one reason or another. For these MIDs the associated PIDs are deleted to preserve anonymity of the purses. The remaining MIDs are used to identify the appropriate video frames which can be automatically processed to extract vehicle registration numbers in order that their owners can be pursued for payment. Some vehicles may pass along the express lanes with defective or non-existent communication equipment or electronic purses. The video images 18 of these vehicles will be processed for pursuit of toll fees with appreciable surcharge.

The principle of local identification and subsequent payment by electronic cash can be extended to individuals.

Various personal identification methods are available such as personal electronic transponder tags which transmit an identification code on interrogation, or finger-print readers, for example. It is envisaged that an entrance region to a sporting event may be covered by an infra-red communication system allowing the use of hand-held communication devices.

I claim:

1. A system for toll payment by mobiles comprising:

a communication device and an electronic purse coupled to the device located on each mobile, the electronic purse being part of an electronic cash system;

localiser means for localizing the communication devices;

a remote communication system for communicating with the mobile communication devices to effect toll payments by exchanging cryptographically secure value transfer messages;

means for obtaining a mobile identifier identifying the communication device or the mobile carrying the electronic purse;

means for correlating temporarily the mobile identifier with an identifier for the electronic purse; and means for (a) discarding the mobile identifier if the toll payment transaction is completed satisfactorily or (b) discarding the purse identifier if the toll payment transaction fails.

2. The system as claimed in claim 1 wherein the remote communication system is a cellular telephone system and each communication device is a mobile telephone and the mobile identifier is the mobile telephone identifier.

3. The system as claimed in claim 2, wherein the localiser means identifies the presence of a mobile within a general area.

4. The system as claimed in claim 2, wherein the localiser means comprises a radio or satellite location system.

5. The system as claimed in claim 2 wherein the cellular telephone system is a GSM system including personal smart cards and the mobile identifier is the personal identifier in the GSM system.

6. The system as claimed in claim 5, wherein the localiser means identifies the presence of a mobile within a general area.

7. The system as claimed in claim 5, wherein the localiser means comprises a radio or satellite location system.

8. The system as claimed in claim 1 wherein the mobile identifier is an optical image, the means for obtaining which is a camera associated with the location means.

9. The system as claimed in claim 8, wherein the localiser means comprises an observation station associated with a channelling system for the mobiles whereby mobiles may be individually located in channels as they pass the observation station.

10. The system as claimed in claim 8, wherein the localiser means comprises a radio or satellite location system.

11. The system as claimed in claim 1, wherein the localiser means comprises an observation station associated with a channeling system for the mobiles whereby mobiles may be individually located in channels as they pass the observation station.

12. The system as claimed in claim 1, wherein the localiser means identifies the presence of a mobile within a general area.

13. The system as claimed in claim 1, wherein the localiser means comprises a radio or satellite location system.

* * * * *